United States Patent
Granger

(10) Patent No.: US 9,961,881 B2
(45) Date of Patent: May 8, 2018

(54) BIKE-ATTACHED DOG TETHER

(71) Applicant: Damon G. Granger, Honor, MI (US)

(72) Inventor: Damon G. Granger, Honor, MI (US)

( * ) Notice: Subject to any disclaimer, the term of this patent is extended or adjusted under 35 U.S.C. 154(b) by 118 days.

(21) Appl. No.: 14/566,763

(22) Filed: Dec. 11, 2014

(65) Prior Publication Data

US 2016/0165848 A1  Jun. 16, 2016

(51) Int. Cl.
| A01K 27/00 | (2006.01) |
| A01K 29/00 | (2006.01) |
| A01K 1/04 | (2006.01) |
| B62J 99/00 | (2009.01) |

(52) U.S. Cl.
CPC .............. *A01K 27/003* (2013.01); *A01K 1/04* (2013.01); *A01K 27/001* (2013.01); *A01K 27/002* (2013.01); *A01K 29/00* (2013.01); *B62J 99/00* (2013.01)

(58) Field of Classification Search
CPC .... A01K 27/003; A01K 15/027; A01K 27/00; B62J 2099/0073
USPC .......................................... 119/712, 769, 771
See application file for complete search history.

(56) References Cited

U.S. PATENT DOCUMENTS

| 1,699,308 | A | * | 1/1929 | Postings | .............. | A01K 15/027 |
| | | | | | | 119/704 |
| 3,870,296 | A | * | 3/1975 | Ellis | ........................ | A63H 37/00 |
| | | | | | | 119/792 |
| 3,994,508 | A | * | 11/1976 | Danner | .................. | B62B 15/001 |
| | | | | | | 280/213 |
| 4,738,222 | A | * | 4/1988 | Terry | ........................ | A01K 1/04 |
| | | | | | | 119/781 |
| 4,854,269 | A | | 8/1989 | Arntzen | | |
| 5,033,409 | A | | 7/1991 | Sabot | | |
| 5,215,037 | A | | 6/1993 | Allred | | |
| 5,375,561 | A | | 12/1994 | Gundersen | | |
| 5,526,774 | A | * | 6/1996 | Swindall, Jr. | ............ | A01K 1/04 |
| | | | | | | 119/787 |
| 5,632,233 | A | * | 5/1997 | Kovach | ..................... | A01K 1/04 |
| | | | | | | 119/771 |
| 5,842,445 | A | | 12/1998 | Barbour | | |
| 6,148,772 | A | | 11/2000 | Keyek-Frannsen | | |
| 6,607,208 | B2 | * | 8/2003 | Dartland | .................. | B62J 11/00 |
| | | | | | | 280/204 |
| 6,874,448 | B1 | | 4/2005 | Fleck | | |
| 7,013,840 | B2 | | 3/2006 | Leon | | |
| 7,017,526 | B2 | | 3/2006 | Chen | | |
| 8,006,650 | B2 | | 8/2011 | Tollman | | |
| 8,151,737 | B1 | * | 4/2012 | Alonzo | ................. | A01K 27/003 |
| | | | | | | 119/798 |

(Continued)

*Primary Examiner* — Marc R Burgess
(74) *Attorney, Agent, or Firm* — Northern Michigan Patent Law, PLC

(57) ABSTRACT

A tether apparatus for connecting a dog to a bike for running with the bike. The tether comprises a continuously flexible wand with a bow-like curvature in a vertical plane and an S-curvature in a horizontal plane. The wand is attached to a bike frame at front and mid-points, and a tail end is spaced to the rear and side of the bike. The tail end includes a short vertical harness connector hanging freely from the tail end for vertical attachment to a dog's collar or harness from above. A dog is accordingly tethered under the tail end of the wand, spaced to the rear and side of the bike, with the flexible wand absorbing shock and load when the dog's position and speed differ relative to the bike.

9 Claims, 5 Drawing Sheets

(56) References Cited

U.S. PATENT DOCUMENTS

| | | | |
|---|---|---|---|
| 8,253,572 B2 | 8/2012 | Lytle, Jr. | |
| 8,544,420 B2* | 10/2013 | Leon | A01K 27/003 |
| | | | 119/771 |
| 2005/0005876 A1 | 1/2005 | Calvi | |
| 2005/0034685 A1 | 2/2005 | Chen | |
| 2009/0139463 A1* | 6/2009 | Morrow | A01K 1/04 |
| | | | 119/771 |
| 2009/0229536 A1* | 9/2009 | Chen | A01K 1/0281 |
| | | | 119/771 |
| 2011/0277699 A1 | 11/2011 | McCarthy et al. | |
| 2014/0283759 A1* | 9/2014 | Bianchi | A01K 1/04 |
| | | | 119/771 |

* cited by examiner

BIKE-ATTACHED DOG TETHER

RELATED APPLICATIONS/PRIORITY BENEFIT CLAIM

Not applicable.

FIELD

The subject matter of the present application is in the field of dog walking devices attached to bicycles and similar human-powered vehicles.

BACKGROUND

Tether supports for tethering dogs to bicycles (bikes) for exercise are known. Most seem to employ a rigid bar or frame extending to the side or rear of the bike, with an attachment for a leash. Some have flexible joints or spring members, apparently to absorb shock.

In my experience and opinion, prior tether supports for bikes are often uncomfortable and difficult to use for both dog and rider, interfering with their respective running and riding. A tether support with a long, unsupported leash may be suitable for easy rides on paved roads and sidewalks, but is generally unsuitable for trail riding and mountain biking. A short, rigid tether support might help keep a dog on-trail along narrow paths, but can jerk both dog and rider while moving when their speed and direction do not match, and can jolt the dog during sudden stops.

BRIEF SUMMARY

I have invented a dog tether for a bike that improves the ride for both dog and rider, with good control on both rough, narrow trails and paved roads. My tether includes a tether support in the form of a continuously flexible, elastically-loadable pole or wand (hereafter "wand") with a forward end mounted to the bike frame at two longitudinally-spaced points. For example, the front end of the wand can be attached to an upper portion of the bike's down tube and a mid-point of the wand can be attached to the bike's seat tube. A rear curved free end or "tail" of the wand is cantilevered out behind and to one side of the bike, and supports a short vertical harness connector that freely hangs vertically below the tail. When attached to a bike, the free end of the harness connector hangs above the ground, and can be connected to an upper part of a dog's collar or harness from above the dog, such that the dog is tethered beneath the tail of the wand.

The wand is continuously flexible along its length, such that any load on the wand is distributed over the entire length. Construction of the wand may be solid or hollow, one-piece or cored. Possible materials include, without limitation, fiberglass, fiber-composites, flexible wood, and flexible spring metal, with or without coatings or outer layers. The cross-sectional shape of the wand may vary, with tubular or cylindrical being currently preferred, although other cross-sectional shapes are possible as long as the wand can be loaded and flexed in both vertical and horizontal planes.

In a further form, the wand is pre-curved. In a further form, the wand is curved in both the vertical and horizontal planes. In a further form, the wand has a bow-type curvature in the vertical plane and an S-type curvature in the horizontal plane.

In a further form, the wand front end and mid-point include bike-mounting means defining a longitudinal wand centerline substantially aligned with a bike frame when attached to a bike. The centerline is intersected by the wand body at three points—front end, mid-point, and tail. In a preferred form, the bike-mounting means includes means for securing the front end of the wand against a first side of a bike's frame and for securing the mid-point of the wand against a second, opposite side of the bike's frame, while the tail of the wand is curved back across the centerline and terminates at the opposite side of the bike.

It may be possible to secure the wand to the bike frame in pre-tension, similar to a strung archery bow.

These and other features and advantages of the invention will become apparent from the detailed description below, in light of the accompanying drawings.

DETAILED DESCRIPTION

Figure 1:
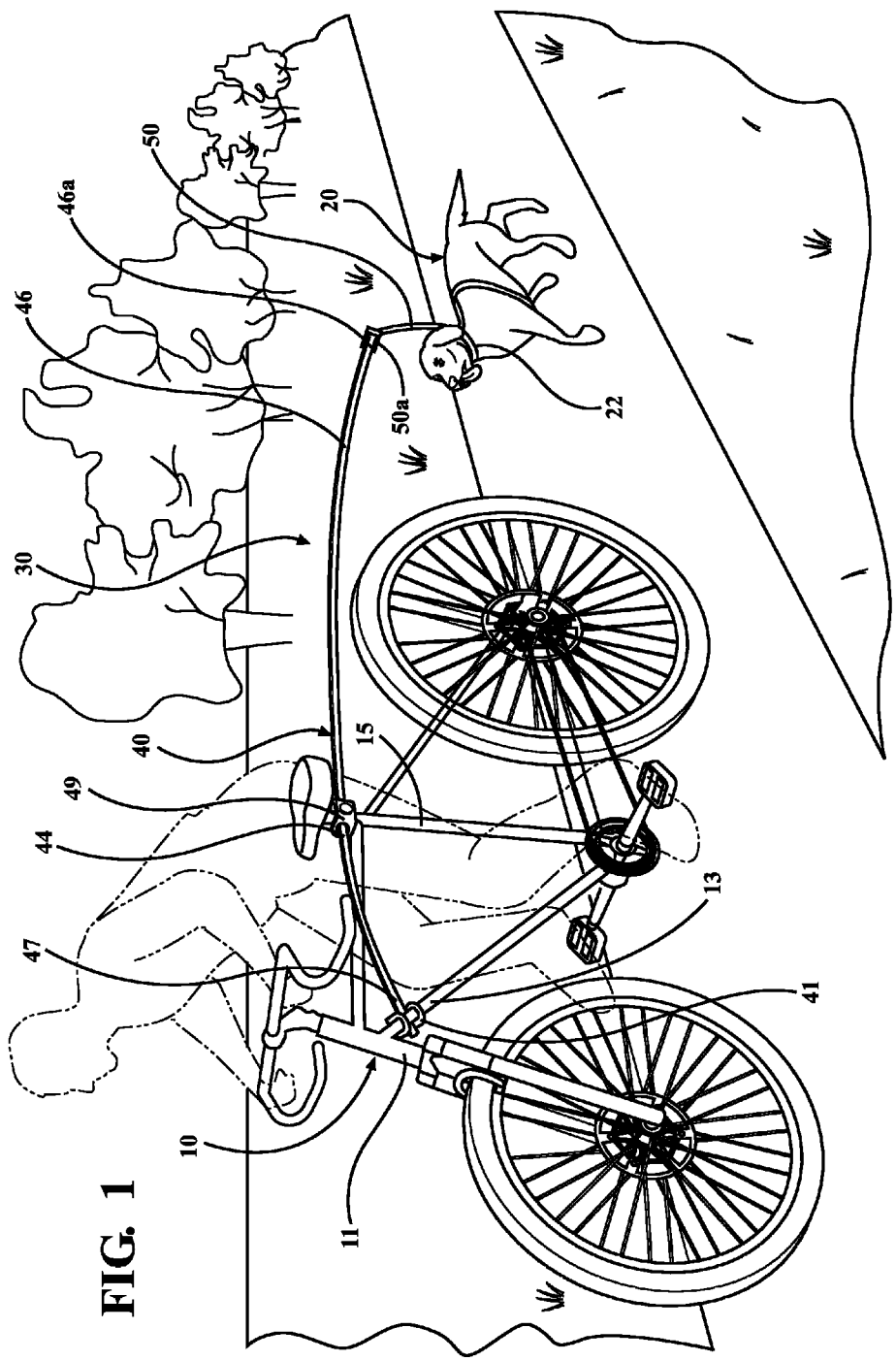
FIG. 1 is a front perspective view of a tether according to the invention, installed on a bike.

Referring first to FIG. 1, a tether 30 according to the invention is shown in exemplary form in order to teach how to make and use the claimed invention. Tether 30 is shown attached to a bike 10, with a dog 20 tethered to the rear or tail end of the tether. Bike 10 schematically represents any type of bicycle, and should be considered to include similar human-powered wheeled vehicles including tricycles, recumbent bikes and the like.

Tether 30 includes a tether support in the form of a wand 40 attached to bike frame 11 at the wand's front end 42 and mid-point 44, and a flexible leash-type harness connector 50 hanging vertically from a terminal end 46a of tail 46. Wand 40 in the illustrated example is a continuously flexible pole member, for example made from a continuous hollow or solid pole of fiberglass with a substantially cylindrical cross-section, for example on the order of four to six feet long and 1-inch to 1-¼ inches in diameter, although the length and diameter may vary depending on factors such as bike style or size, dog size, expected riding conditions, and wand material. "Mid-point" 44 need not be exactly in the middle of the wand 40; the term is merely used as a convenient way to describe a middle portion of the wand between the ends, and the mid-point may be closer to the front end or to the tail-end, depending on the length of the wand, the bike frame and convenient mounting points, and other factors that will be apparent to those skilled in the art.

The length and diameter and flexibility of the wand 40 may vary, provided that tail 46 extends rearwardly of the rear bike wheel 12 and to one side of the bike 10 a distance sufficient to space the dog safely from the bike; and provided that the flexible wand has sufficient strength such that the force of the dog acting against tail 46 does not collapse, fully straighten, or reverse the curvature of the tail; and, does not allow the dog to come forwardly of the bike, or into contact with the bike, or to cross behind the rear wheel to the other side of the bike.

Harness connector 50 at the tail end 46*a* of the wand is a short vertical free-hanging piece that moves freely relative to the tail, i.e. harness connector 50 is movably attached to the tail end of the wand with a connection more flexible than the flexibility of the wand, such that the harness connector (and the dog) may move a limited amount relative to the wand without tensioning or compressing ("loading") the wand. Harness connector 50 may be a non-rigid length of strap, cable, cord, or chain; or, a rigid or semi-rigid member pivotally connected at its upper end 50*a* to wand tail-end 46*a*, preferably with a soft or resilient material or cushioned covering to protect the dog in case of sudden contact. These are examples and are not limiting as to the structure of the harness connector or its manner of attachment to tail-end 46*a*.

Harness connector 50 hangs vertically from the wand, short enough to terminate above the ground at a height corresponding to the top 22*a* of a collar or harness 22 worn by the dog, but long enough to keep the end of the wand spaced above the dog's head to prevent contact. Harness connector 50 includes means (hook, clip, strap, cord, side-release buckle, carabiner, etc., without limitation) for connection to top 22*a* of collar/harness 22, for example by attachment to a mating connector structure carried by an upper part of collar/harness 22, or directly to a strap or other standard portion of the collar/harness. In order to ensure an optimum above-ground termination point for the end of the harness connector in relation to different bikes and dogs, the harness connector may be lengthwise adjustable.

The height of wand tail-end 46*a* (and harness connector 50) relative to a dog may also be adjusted by attaching the front end 42 to a higher or lower portion of the bike frame in order to adjust the angle of the wand and thus raise or lower the tail-end 46*a* relative to the ground. Depending on the frame, the mid-point 44 of wand 40 may also be mounted higher or lower on the bike frame to adjust the height of tail-end 46*a*, although the primary function of the mid-point attachment to the bike is to act as a fulcrum.

Figure 2A:
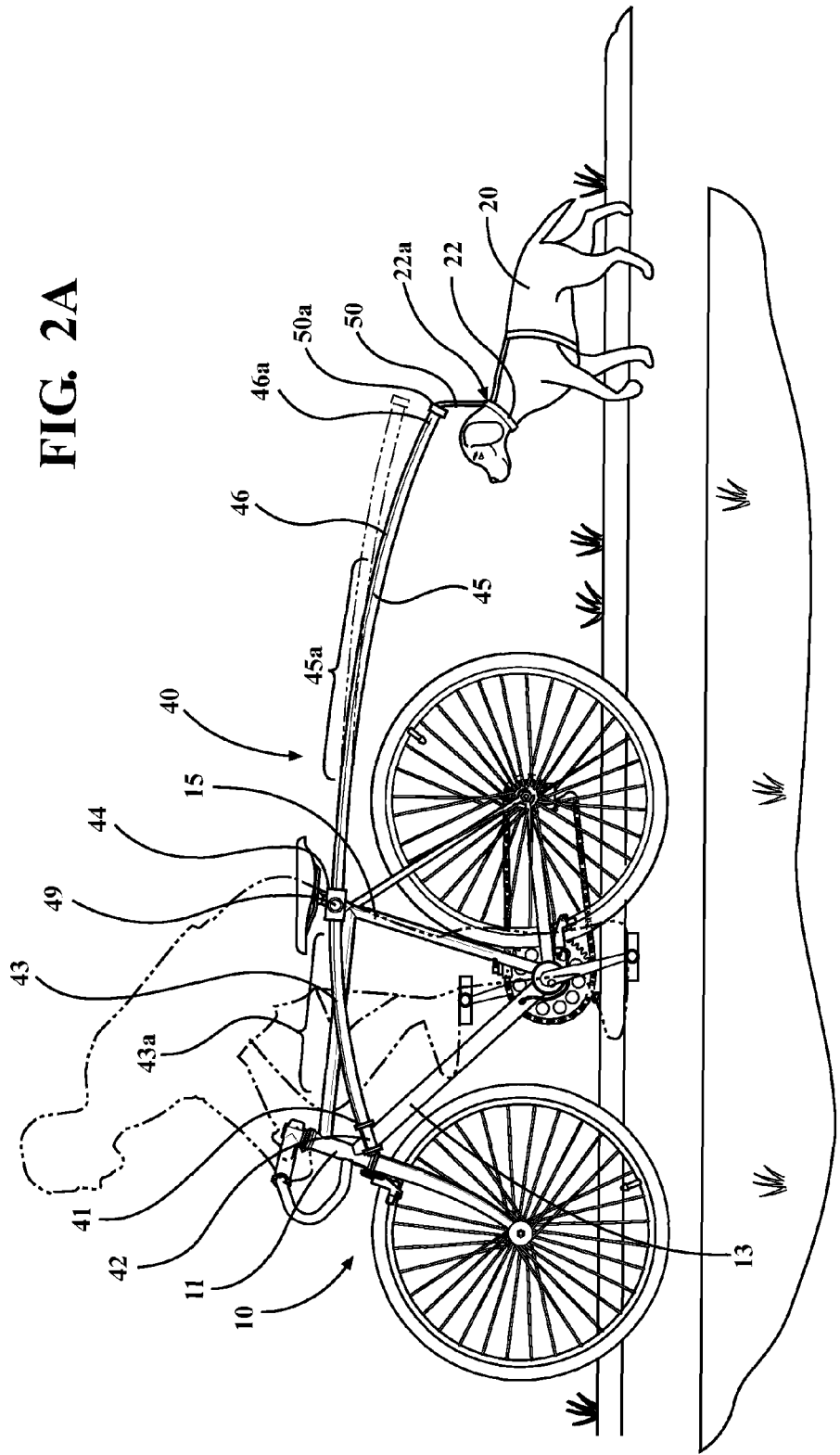
FIG. 2A is a side elevation view of the tether and bike of FIG. 1.

Referring to FIG. 2A, wand 40 has a first bow-like curvature in a first vertical plane (the plane perpendicular to the ground when mounted on a bike), with at least the rear part 45 of the wand between mid-point 44 and tail 46 having at least one major curve 45*a*. Optionally, and preferably, the forward part of the wand 43 from mid-point 44 to front end 42 is also curved in the vertical plane with at least one major curve 43*a*. The effect of the vertical plane curvature in regions 43 and 45 is to shape the wand somewhat like an archery bow in the vertical plane, to absorb force in compression or tension (both vertically and horizontally, as shown in phantom lines) when the dog's speed is greater or less than the speed of the bike, or when the dog and bike are at different elevations due to uneven ground, and to release that stored force smoothly as the respective speeds (and positions) of dog and bike equalize. As shown in phantom lines in FIG. 2A, it is preferred to pre-tension the tail 46 relative to the dog by bending it downwardly from its neutral or at-rest height (solid lines) to a tensioned height (phantom lines) to attach the connector 50 to the dog's harness. This maintains an upward wand tension relative to the dog, preventing the dog from getting above the tip of the tail and potentially coming into contact with the tail on uneven ground.

Figure 2B:
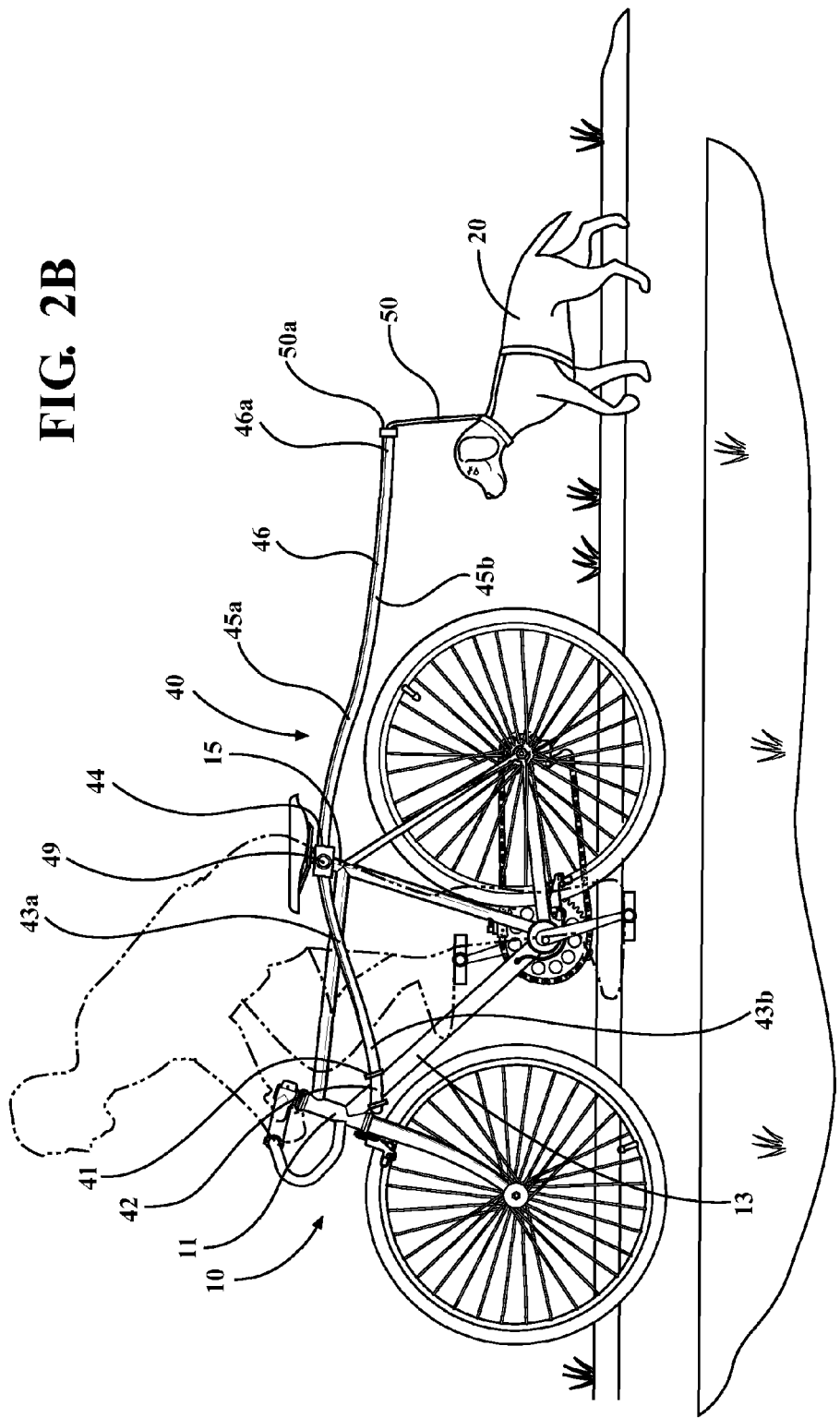
FIG. 2B is a side elevation view of a modified tether curvature.

In an alternate form shown in FIG. 2B, the bow effect is like that of a recurve bow, with reverse minor curve 43*b* in region 43 closest to front end 42 and reverse minor curve 45*b* in tail 46 near end 46*a*, opposite the major curvature of the adjacent curved portions 43*a* and 45*a*, respectively.

Figure 3:
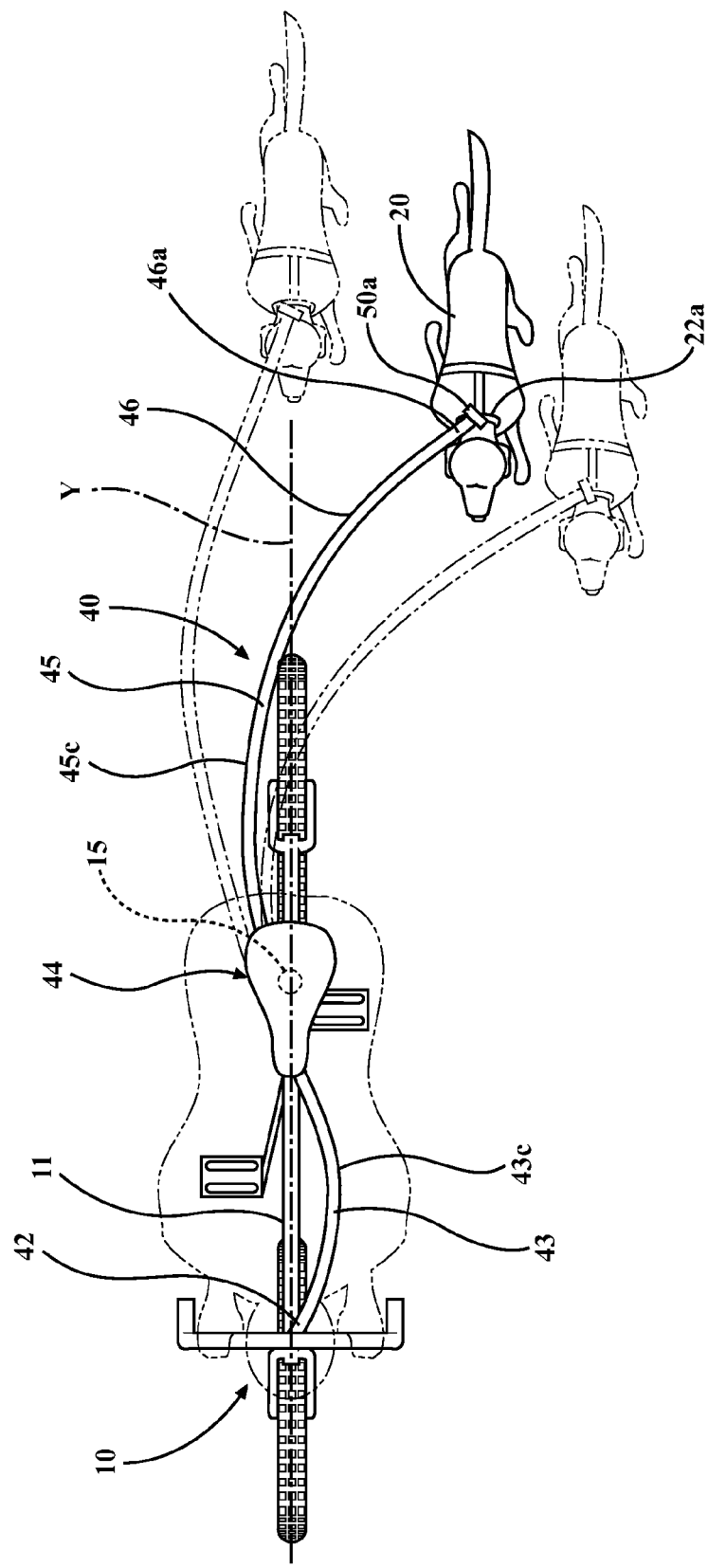
FIG. 3 is a top plan view of the tether and bike of FIG. 1.

Referring next to FIG. 3, wand 40 has a second generally S-shaped curvature in a horizontal plane (the plane parallel to the ground when mounted to a bike). Front end 42 of the wand is secured to a forward part of the bike frame 11, for example to an upper portion of the down tube 13, while region 43 between the front end 42 and mid-point 44 curves in a first direction with a convex bow 43*c* to one side (left) of the bike frame. Mid-point 44 of the wand is secured to a mid-portion of the bike frame, for example to seat tube 14 between the seat 15 and cross-bar 16. Region 45 of the wand between mid-point 44 and tail 46 curves to a second, opposite direction with a convex bow 45*c* to the other (right) side of the bike frame. The length of rear portion 45 and tail 46 of the wand 40 is longer than the length of front portion 43, such that tail end 46*a* terminates on the other (left) side of the bike at a point sufficient to space a dog safely from the rear of the bike.

Still referring to FIG. 3, the S-curvature of wand 40 relative to the bike frame defines a centerline Y that the wand intersects at three points: front end 42 where it is secured to the bike, mid-point 44 where it is secured to the bike, and the junction of rear portion 45 and tail 46 between mid-point 44 and tail end 46*a* and aligned with points 42 and 44. If wand 40 is manufactured with a horizontal plane S-curve preformed in the configuration of FIG. 3, the centerline Y is essentially defined by these three points on the wand. If wand 40 is flexed partially or fully to the horizontal plane S-curve of FIG. 3 by virtue of attachment to the bike frame, then centerline Y may also be considered to be defined essentially by the centerline of the bike frame when viewed from above. Bike mounting means 41, 49 (visible in FIGS. 1, 2A, 2B, 4, and 5) essentially define the two forward points of intersection with the bike centerline.

The horizontal plane S-curvature of wand 40 shown in FIG. 3 absorbs and releases forward and rearward differences in momentum force between the dog and bike, similar to the vertical plane bow-curvature of the wand shown in FIG. 2. However, the horizontal plane S-curvature of wand 40 also positions the tail end 46 (and the position of dog 20) to one side of the bike, with the bias of the flexible wand tending to stay in its un-deformed, unloaded, natural curved shape resisting any tendency of the dog to cross behind the bike to the opposite side.

FIG. 3 shows the at-rest or "neutral" tether position for the dog in solid lines, defined by tail end 46 and vertical hanging connector 50. The dog is spaced to the side of the bike (FIG. 2) and to the rear of the bike 10 (FIG. 3). While the flexibility of wand 40 allows dog 20 to comfortably move some distance forward, backward, and sideways relative to bike 10, as suggested in the phantom line positions, all such movement from the neutral position requires force in compression or tension against the wand's normal at-rest shape. Accordingly, the wand gently biases the dog to the neutral tether position of tail 46.

Wand 40 can be pre-tensioned against the bike frame by securing it to the frame at the front end 42 and/or mid-point 44 such that the wand is not in its normal, at-rest shape, but is either shortened/compressed or elongated/tensioned before being secured in place on the bike frame. In this case the wand would already be loaded in one direction or another when tail end 46 is in the "neutral" position shown in solid lines in FIG. 3.

Figure 4:
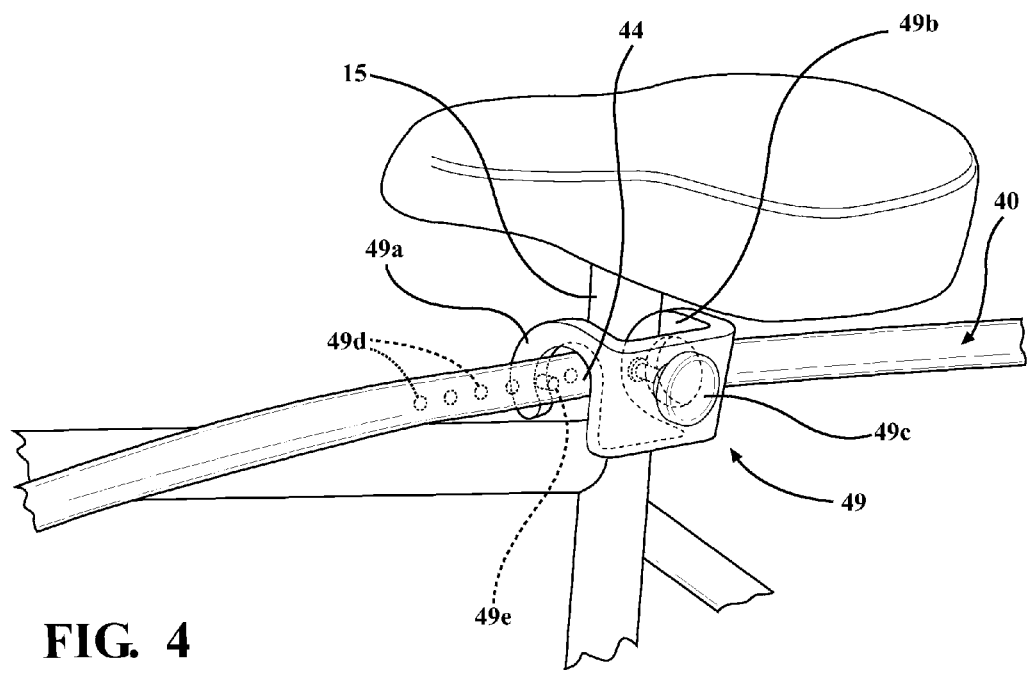
FIG. 4 is a side elevation detail of a forward portion of the tether of FIG. 1 where it is secured to the bike frame.

FIG. 4 shows exemplary means for removably securing wand 40 to the frame of bike 10 at front end 42 and mid-point 44. For simplicity, only the mid-point bike-securing means 49 at seat tube 15 is shown, but it will be understood that the means 41 (see earlier Figs.) for securing front end 42 to down tube 13 may be identical or substantially identical.

Illustrated bike-securing structure 49 is a substantially rigid bracket with a pair of generally C- or U-shaped arms 49a and 49b secured in compression to mid-point 44, for example with a set screw 49c acting against the seat tube. The wand may be additionally secured against longitudinal shifting relative to the clamp 49 by extending the illustrated set screw 49c through the bike frame (seat tube) into one or more suitable holes or receptacles 49d on the wand; by pre-tensioning the wand so that friction holds it in place longitudinally in the clamp arms; or by providing an additional set screw or stud such as 49e that engages the wand directly from the clamp arm(s) rather than through the bike frame. Either or both of the attachment means 41, 49 may allow longitudinal adjustment of the adjacent portion of wand 40 to accommodate different bike frame spacing and tube thicknesses, or to increase or decrease any pre-tension of the wand relative to the bike.

It is preferable that front end 42 of the wand be attached to one side of the down tube (the left side in the example of FIGS. 1-4), while mid-point 44 be attached to the opposite side of the seat tube (the right side in the example of FIGS. 1-4).

Figure 5:
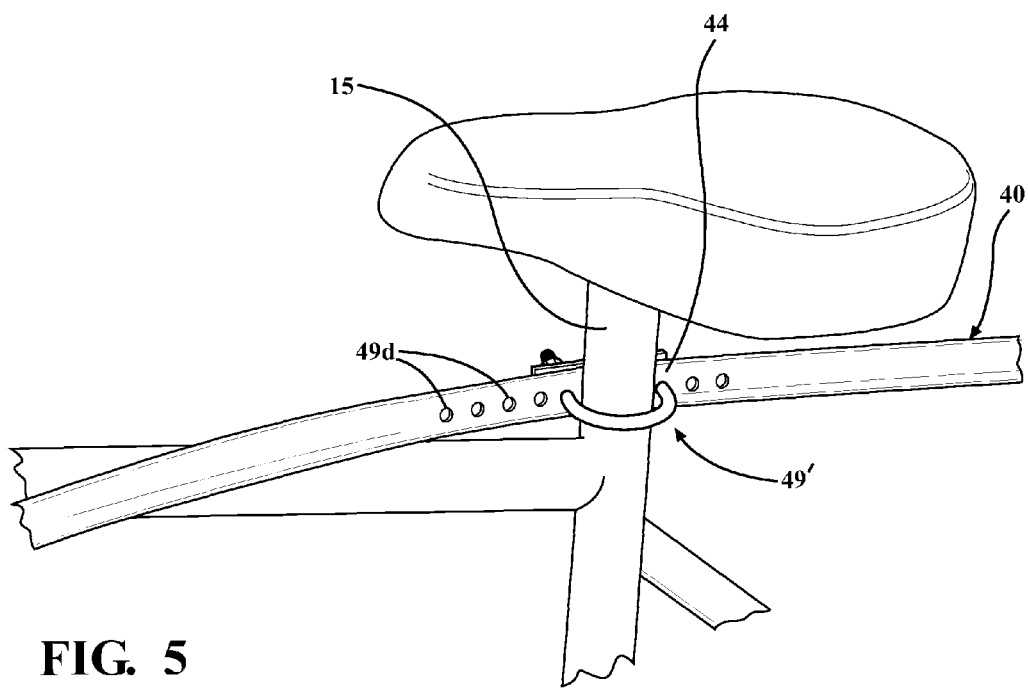
FIG. 5 is similar to FIG. 4, but shows an alternate bike mounting structure.

FIG. 5 illustrates an alternate bike securing means 49 on the wand, in the form of a U-bolt secured through holes 49d in the wand mid-point 44 and around seat tube 15. As in the Figs. above, front end 42 of the wand may be secured to the bike frame in the same fashion.

It will be understood that the illustrated securing means 49, 49' represent but two possible ways of securing the wand 40 to the bike frame. Other possible means for securing the wand 40 to portions of the bike frame include bolts or screws inserted through the wand into the bike frame; industrial-strength hook-and-loop strapping secured to the wand and wrapped around the bike frame in various patterns; C-type clamps attached to or integrally molded into the wand, sized to snap over the relevant portion of the bike frame with a longitudinally locking snap-fit. These are examples only, and are not intended to limit the various means that can be applied to or carried by or incorporated into the wand to secure it to a bike frame, as will be recognized by those skilled in the art.

It is preferred that the securing means 41, 49 at the front and mid-points of the wand be located on opposing sides of the wand to engage the bike frame in opposite directions, as shown in FIGS. 1-4. This preference will depend, in part, on the inherent strength of the securing means.

Description of Operation

In operation, the tether 30 is used by securing front end 42 and mid-point 44 to the bike frame, for example using means as illustrated in FIG. 4 or 5, with the tail end 46 of the wand in a desired position to the rear and side of the bike centerline. Dog 20 is then secured to the tail end 46 of the wand via harness connector 50 attached vertically to the dog's collar or harness from above, preferably with the tail end 46 flexed downwardly before attaching the connector 50 to give the wand an upward pre-tension relative to the dog as described above. Bike 10 can then be ridden with the dog comfortably and securely tethered to the bike, with the wand gently absorbing and releasing forces generated by differences in speed and position between the dog and bike, and keeping the dog out of contact with both the bike and wand.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention should accordingly be construed by what the above disclosure teaches and suggests to those skilled in the art, and by any claims that the above disclosure supports in this application or in any other application claiming priority to this application.

What is claimed is:

1. A tether apparatus for securing a dog to a bike via a collar or harness worn by the dog, the apparatus comprising:
    a continuously flexible wand comprising a front end including bike-mounting means for securing the front end to a bike frame, a mid-point spaced from the front end and including bike-mounting means for securing the mid-point to a mid-portion of a bike frame, and a tail portion with a tail end spaced from the mid-point a distance greater than the mid-point is spaced from the front end, and a harness connector comprising a short free-hanging member movably attached to the tail end of the wand with a connection more flexible than the flexibility of the wand; wherein,
    the wand is pre-curved with a continuously curved bow curvature in a vertical plane, the bow curvature being upwardly convex with a maximum height at the mid-point; and wherein,
    the wand is pre-curved with an S-curvature in a horizontal plane, the S-curvature being convex in a first direction between the front end and mid-point of the wand, and the S-curvature being convex in a second opposite direction between the mid-point and tail end of the wand such that a centerline passing through the front end and mid-point of the wand is intersected by the front end, mid-point, and tail portion of the wand and further such that the tail end is spaced in the horizontal plane to one side of the centerline.

2. The tether apparatus of claim 1, wherein the bow curvature in the vertical plane includes major curvature and opposing minor curvature in at least one of a forward region of the wand between the front end and midpoint and a rear region of the wand between the midpoint and tail end.

3. The tether apparatus of claim 2, wherein both the forward region and the rear region of the wand include major and minor opposing curvature.

4. The combination of a bike and a tether apparatus for securing a dog to the bike via a collar or harness worn by the dog, the apparatus comprising:
    a continuously flexible wand comprising a front end removably secured to a front frame portion of the bike, a mid-point spaced from the front end and removably secured to a mid-frame portion of the bike adjacent a seat of the bike, and a tail portion with a tail end spaced from the mid-point a distance greater than the mid-point is spaced from the front end, and a harness connector comprising a short free-hanging member movably attached to the tail end of the wand with a connection more flexible than the flexibility of the wand; wherein, the wand has a continuously curved bow curvature in a vertical plane, the bow curvature being upwardly convex with a maximum height at the mid-point; and wherein, the wand has an S-curvature in a horizontal plane, the S-curvature being convex in a first direction between the front end and mid-point of the wand, and the S-curvature being convex in a second opposite direction between the mid-point and tail end of the wand such that a centerline passing through the front frame and mid-frame portions of the bike is intersected by the front end, mid-point, and tail portion of the wand, and further wherein the tail end is spaced in the horizontal plane to one side of the centerline; and wherein, the harness connector hangs vertically from the tail end of the wand with a lower end spaced above the ground.

5. The combination of claim 4, wherein the bow curvature in the vertical plane includes major curvature and opposing minor curvature in at least one of a forward region of the wand between the front end and midpoint and a rear region of the wand between the midpoint and tail end.

6. The combination of claim 5, wherein both the forward region and the rear region of the wand include major and minor opposing curvature.

7. The combination of claim 4, wherein the harness connector hangs vertically from the tail end of the wand with a lower end spaced above the ground and vertically attached from above to an upper part of a collar or harness worn by a dog.

8. The combination of claim 4, wherein the wand has a pre-curvature in at least one of the vertical and horizontal planes and is secured to the bike frame in pre-tension against the pre-curvature.

9. The combination of claim 4, wherein the tail of the wand is secured to the dog in vertical pre-tension.

* * * * *